US009385869B1

(12) United States Patent
Satish et al.

(10) Patent No.: US 9,385,869 B1
(45) Date of Patent: Jul. 5, 2016

(54) SYSTEMS AND METHODS FOR TRUSTING DIGITALLY SIGNED FILES IN THE ABSENCE OF VERIFIABLE SIGNATURE CONDITIONS

(71) Applicant: Symantec Corporation, Mountain View, CA (US)

(72) Inventors: Sourabh Satish, Fremont, CA (US); Christopher J. Peterson, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 206 days.

(21) Appl. No.: 14/225,872

(22) Filed: Mar. 26, 2014

(51) Int. Cl.
*H04L 9/32* (2006.01)
*H04L 29/06* (2006.01)
*H04L 12/40* (2006.01)
*H04L 12/24* (2006.01)
*H04L 9/08* (2006.01)

(52) U.S. Cl.
CPC ...... *H04L 9/3247* (2013.01); *G06F 2221/2129* (2013.01); *H04L 9/0877* (2013.01); *H04L 12/2461* (2013.01); *H04L 12/40104* (2013.01); *H04L 29/06551* (2013.01); *H04L 29/06659* (2013.01); *H04L 63/0884* (2013.01); *H04L 2209/26* (2013.01); *H04L 2463/041* (2013.01)

(58) Field of Classification Search
CPC ............ H04L 9/3247; H04L 29/06659; H04L 2209/26; H04L 2463/041; H04L 29/06551; H04L 9/0877; H04L 12/2461; H04L 12/40104; G06F 2221/2129
See application file for complete search history.

(56) References Cited

U.S. PATENT DOCUMENTS

| 8,112,633 B1 * | 2/2012 | Clyde | H04L 9/321 713/176 |
| 8,572,730 B1 * | 10/2013 | Sobel | H04L 9/0891 726/1 |
| 8,996,875 B1 * | 3/2015 | Sobel | G06F 21/562 713/176 |
| 9,058,504 B1 * | 6/2015 | Swanson | G06F 21/52 |
| 9,270,467 B1 * | 2/2016 | Chen | H04L 9/3236 |
| 2006/0112419 A1 * | 5/2006 | Brown | H04L 63/0428 726/5 |
| 2008/0244722 A1 * | 10/2008 | Satish | G06F 21/33 726/9 |
| 2011/0264917 A1 * | 10/2011 | Barthelemy | H04L 9/3255 713/176 |

(Continued)

OTHER PUBLICATIONS

"Catalog Files and Digital Signatures", http://msdn.microsoft.com/en-us/library/windows/hardware/ff537872(v=vs.85).aspx, Microsoft, (Feb. 13, 2014).

(Continued)

*Primary Examiner* — Krisna Lim
(74) *Attorney, Agent, or Firm* — ALG Intellectual Property, LLC

(57) ABSTRACT

A computer-implemented method for trusting digitally signed files in the absence of verifiable signature conditions may include (1) receiving, from an agent on at least one endpoint device, signature information that indicates that a file encountered by the endpoint device has been digitally signed, (2) generating, based at least in part on the signature information received from the endpoint device, a reputation for the file that indicates the file's trustworthiness, (3) receiving a request from an additional agent for reputation information for the file, and (4) sending, in response to receiving the request, the reputation for the file to the additional agent to enable the additional agent to determine the trustworthiness of the file in the absence of verifiable signature conditions. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2011/0289318 A1* | 11/2011 | Zhang | H04L 9/3247 | 713/176 |
| 2011/0302651 A1* | 12/2011 | Bates | G06F 8/456 | 726/22 |
| 2012/0179917 A1* | 7/2012 | Yach | G06F 21/121 | 713/189 |
| 2012/0317412 A1* | 12/2012 | Zaverucha | H04L 9/3265 | 713/156 |
| 2013/0007459 A1* | 1/2013 | Godfrey | G06Q 10/107 | 713/175 |
| 2013/0055369 A1* | 2/2013 | Kumar | H04W 4/001 | 726/7 |
| 2014/0259159 A1* | 9/2014 | Banga | G06F 21/56 | 726/22 |
| 2015/0222437 A1* | 8/2015 | Gertner | H04L 9/3247 | 713/176 |

OTHER PUBLICATIONS

Ramzan, Zulfikar et al., "Reputation-based Security—An Analysis of Real World Effectiveness", http://www.symantec.com/content/en/us/enterprise/media/security_response/whitepapers/reputation_based_security.pdf, as accessed Jan. 31, 2014, Symantec Corporation, (2010).

* cited by examiner

SYSTEMS AND METHODS FOR TRUSTING DIGITALLY SIGNED FILES IN THE ABSENCE OF VERIFIABLE SIGNATURE CONDITIONS

BACKGROUND

Software publishers often use digital signatures to demonstrate the authenticity or legitimacy of their files. For example, a publisher may generate a digital signature for a file that demonstrates the file's authenticity by (1) hashing the file and then (2) encrypting the file's hash using a private encryption key that is uniquely associated with the publisher. The publisher may then embed this digital signature within the file itself or store the digital signature within a separate file. In either case, the digital signature may demonstrate both (1) that the publisher (as opposed to some other potentially malicious entity) created the file and (2) that the file has not been tampered with or otherwise modified since leaving the publisher's possession.

Security software typically trust files that have been digitally signed by trusted entities. However, a device (such as a gateway, file server, or endpoint device) on which this security software runs may not always be able to successfully verify that a file has been digitally signed by a trusted entity. For example, a device may not be in possession of a separate signature file used to digitally sign a file. Moreover, even if a file's signature has been embedded within the file itself, the file's signature may have become corrupted or the device may be unable to successfully process or verify the file's signature.

Unfortunately, if a device is unable to verify that a file has been digitally signed by a trusted entity, then the device may mistakenly mistrust and/or mark the file as suspicious or even malicious, potentially resulting in harmful disruptions to normal business operations. Accordingly, the instant disclosure identifies and addresses a need for systems and methods for trusting digitally signed files in the absence of verifiable signature conditions.

SUMMARY

As will be described in greater detail below, the present document describes various systems and methods for enabling computing devices to trust digitally signed files in the absence of verifiable signature conditions. In one example, a computer-implemented method for performing such a task may include (1) receiving, from an agent on at least one endpoint device, signature information that indicates that a file encountered by the endpoint device has been digitally signed, (2) generating, based at least in part on the signature information received from the endpoint device, a reputation for the file that indicates the file's trustworthiness, (3) receiving a request from an additional agent for reputation information for the file, and (4) sending, in response to receiving the request, the reputation for the file to the additional agent to enable the additional agent to determine the trustworthiness of the file in the absence of verifiable signature conditions.

In one example, the method may also include (1) determining that more than a specified number of distinct endpoint devices have provided the signature information and (2) improving the reputation of the file in response to determining that more than the specified number of distinct endpoint devices have provided the signature information.

In some embodiments, the step of generating the reputation for the file may include (1) determining an operating system used by the endpoint device, (2) determining the location of the endpoint device, (3) determining a security setting utilized by the endpoint device, (4) determining whether the endpoint device represents a secure device, (5) determining the endpoint device's infection history, and/or (6) generating a time stamp associated with receipt of the signature information.

In some examples, the method may also include improving the reputation of the file in response to (1) determining that the endpoint device is using a specific operating system, (2) determining that the endpoint device's operating system is fully patched and up-to-date, (3) determining that the endpoint device has enabled a specific security setting, (4) determining that the number of different locations associated with endpoint devices that have provided the signature information has increased, (5) determining that the distance between endpoint devices that have provided the signature information has increased, (6) determining that the number of different time zones associated with endpoint devices that have provided the signature information has increased, (7) determining that the amount of time that has passed since first receiving the signature information has increased without the occurrence of a negative incident that indicates that the file is malicious, (8) determining that the endpoint device represents a secure device, and/or (9) determining that the endpoint device does not have a history of infections. In some embodiments, the method may also include lowering the reputation of the file in response to determining that a negative incident has occurred that indicates that the file is malicious.

In some examples, the step of generating the reputation for the file may include identifying, based on the signature information, a confidence band for the file. When the confidence band is below a lower confidence threshold, the confidence band may indicate that the file has a bad reputation. In contrast, when the confidence band is above an upper confidence threshold, the confidence band may indicate that the file has a good reputation. In addition, the method may also include adding, based on the reputation specified by the confidence band, the file to a whitelist of trusted files and/or a blacklist of untrusted files.

In some embodiments, the method may also include, after receiving the signature information, recording the signature information in a database for later analysis. Additionally or alternatively, the step of receiving the signature information may include (1) receiving the signature information in response to a proactive request by the backend device for the signature information and/or (2) passively receiving the signature information.

In one embodiment, a system for implementing the above-described method may include (1) an aggregation module, stored in memory, that receives, from an agent on at least one endpoint device, signature information that indicates that a file encountered by the endpoint device has been digitally signed, (2) a reputation module, stored in memory, that generates, based at least in part on the signature information received from the endpoint device, a reputation for the file that indicates the file's trustworthiness, (3) a security module, stored in memory, that (i) receives a request from an additional agent for reputation information for the file and, (ii) in response to receiving the request, sends the reputation for the file to the additional agent to enable the additional agent to determine the trustworthiness of the file in the absence of verifiable signature conditions, and (4) at least one physical processor that executes the aggregation module, the reputation module, and the security module.

In some examples, the above-described method may be encoded as computer-readable instructions on a non-transitory computer-readable medium. For example, a computer-readable medium may include one or more computer-executable instructions that, when executed by at least one processor of a backend computing device, may cause the backend computing device to (1) receive, from an agent on at least one endpoint device, signature information that indicates that a file encountered by the endpoint device has been digitally signed, (2) generate, based at least in part on the signature information received from the endpoint device, a reputation for the file that indicates the file's trustworthiness, (3) receive a request from an additional agent for reputation information for the file, and (4) send, in response to receiving the request, the reputation for the file to the additional agent to enable the additional agent to determine the trustworthiness of the file in the absence of verifiable signature conditions.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
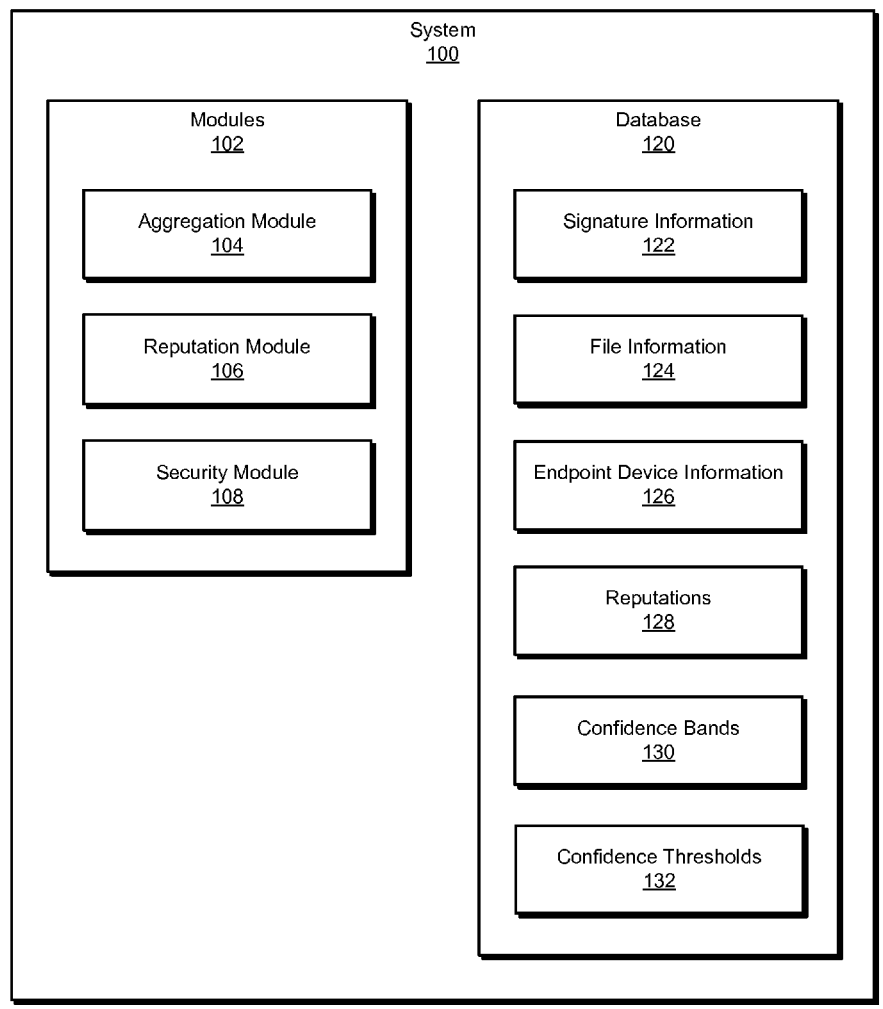
FIG. 1 is a block diagram of an exemplary system for trusting digitally signed files in the absence of verifiable signature conditions.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various exemplary systems and methods for enabling computing devices to trust digitally signed files in the absence of verifiable signature conditions. As will be described in greater detail below, the systems and methods described herein may leverage information collected from computing devices that have successfully verified the authenticity of a file that has been digitally signed to ensure that other computing devices that subsequently encounter the file do not mistakenly classify the file as malicious, even if the file's signature is missing, unavailable, corrupt, or otherwise unverifiable. In addition, by confirming and/or adjusting the file's trustworthiness based on various contextual factors that may impact the reliability of the collected information (including, e.g., the number of devices that have provided the information), the systems and methods described herein may guard against unreliable and/or intentionally distorted information. This may, in turn, increase the accuracy of these trustworthiness determinations, reduce the likelihood of disruptive false positives, and/or conserve system resources.

Figure 2:
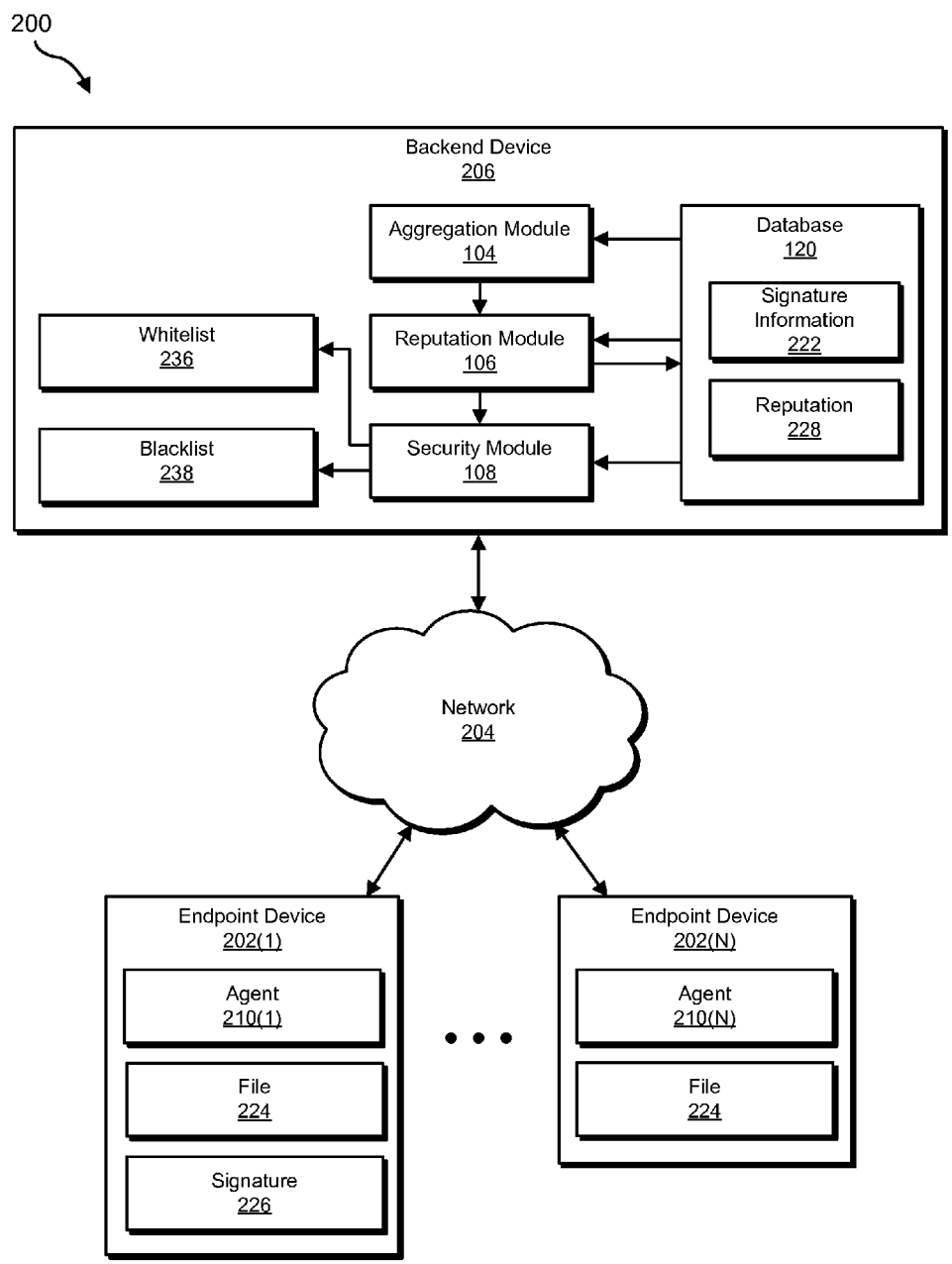
FIG. 2 is a block diagram of an additional exemplary system for trusting digitally signed files in the absence of verifiable signature conditions.

The following will provide, with reference to FIGS. 1-2, detailed descriptions of exemplary systems for trusting digitally signed files in the absence of verifiable signature conditions. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for trusting digitally signed files in the absence of verifiable signature conditions. As illustrated in this figure, exemplary system 100 may include one or more modules 102 for performing one or more tasks. For example, and as will be explained in greater detail below, exemplary system 100 may include an aggregation module 104 programmed to receive, from an agent on at least one endpoint device, signature information that indicates that a file encountered by the endpoint device has been digitally signed. Exemplary system 100 may also include a reputation module 106 programmed to generate, based at least in part on the signature information received from the endpoint device, a reputation for the file that indicates the file's trustworthiness.

In addition, and as will be described in greater detail below, exemplary system 100 may include a security module 108 programmed to receive a request from an additional agent for reputation information for the file. In this example, security module 108 may, in response to receiving the request, send the reputation for the file to the additional agent to enable the additional agent to determine the trustworthiness of the file, even if the file's signature is missing, unavailable, corrupt, or otherwise unverifiable. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., endpoint devices 202(1)-(N) and/or backend device 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, and as will be described in greater detail below, database 120 may be configured to store signature information 122, received from endpoint devices, that identifies files encountered by these endpoint devices that have been digitally signed. Database 120 may also store information that identifies various characteristics of these files (e.g., file information 124) and/or the endpoint devices that provided the signature information (e.g., endpoint device information 126). In addition, database 120 may store information that identifies the reputation of these files (e.g., reputations 128), confidence bands associated with these reputations (e.g., confidence bands 130), and/or confidence thresholds associated with these confidence bands (e.g., confidence thresholds 132).

Database 120 may represent portions of a single database or computing device or a plurality of databases or computing devices. For example, database 120 may represent a portion of backend device 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as backend device 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include one or more endpoint devices 202(1)-(N) in communication with a backend device 206 via a network 204. In one example, one or more of endpoint devices 202(1)-(N) may be programmed with one or more of modules 102 and/or may store all or a portion of the data in database 120. Additionally or alternatively, backend device 206 may be programmed with one or more of modules 102 and/or may store all or a portion of the data in database 120.

In one embodiment, one or more of modules 102 from FIG. 1 may, when executed by at least one processor of endpoint devices 202(1)-(N) and/or backend device 206, enable endpoint devices 202(1)-(N) and/or backend device 206 to generate and share reputations for files that have been digitally signed. For example, aggregation module 104 on backend device 206 may be programmed to receive, from an agent on at least one endpoint device (e.g., agent 210(1) endpoint device 202(1)), signature information 222 that indicates that a file 224 encountered by endpoint device 202(1) has been digitally signed. Reputation module 106 on backend device 206 may then generate, based at least in part on the signature information received from endpoint device 202(1), a reputation for file 224 (e.g., reputation 228) that indicates the trustworthiness of file 224.

At a later point in time, security module 108 on backend device 206 may receive a request from an additional agent (e.g., agent 210(N) on endpoint device 202(N)) for reputation information for file 224. In response to receiving the request, security module 108 may send reputation 228 for file 224 to agent 210(N) to enable agent 210(N) to determine the trustworthiness of file 224 in the absence of verifiable signature conditions. For example, endpoint device 202(N) may determine that file 224 is trustworthy even if a digital signature for file 224 is missing, unavailable, corrupt, or otherwise unverifiable.

Endpoint devices 202(1)-(N) generally represent any type or form of computing device capable of reading computer-executable instructions. Examples of endpoint devices 202(1)-(N) include, without limitation, laptops, tablets, desktops, servers (including file servers), gateways, cellular phones, Personal Digital Assistants (PDAs), multimedia players, embedded systems, wearable devices (e.g., smart watches, smart glasses, etc.), gaming consoles, combinations of one or more of the same, exemplary computing system 510 in FIG. 5, or any other suitable computing device.

Backend device 206 generally represents any type or form of computing device that is capable of collecting and/or analyzing information. Examples of backend device 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between endpoint devices 202(1)-(N) and backend device 206.

Figure 3:
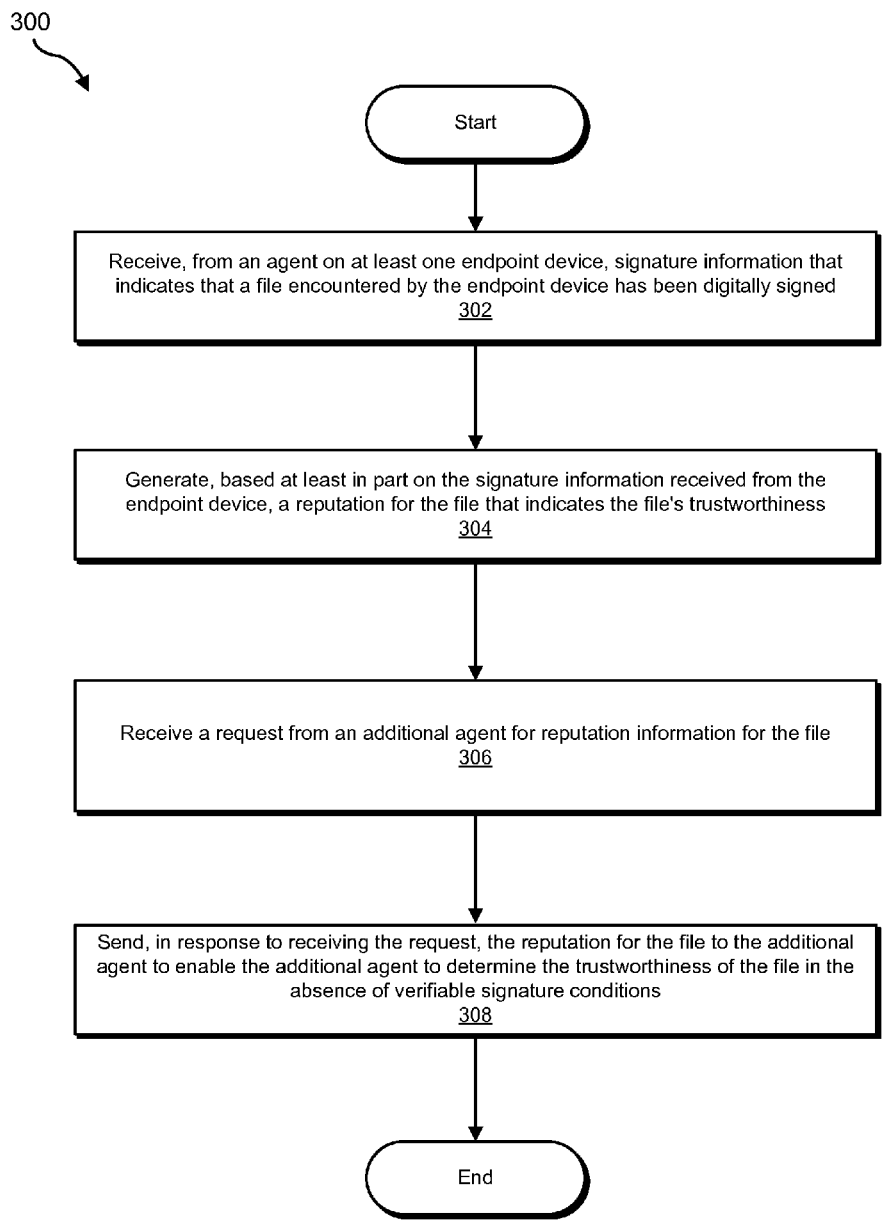
FIG. 3 is a flow diagram of an exemplary method for trusting digitally signed files in the absence of verifiable signature conditions.

FIG. 3 is a flow diagram of an exemplary computer-implemented method 300 for enabling computing devices to trust digitally signed files in the absence of corresponding signature information. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may receive, from an agent on at least one endpoint device, signature information that indicates that a file encountered by the endpoint device has been digitally signed. For example, aggregation module 104 may, as part of backend device 206 in FIG. 2, receive signature information 222 from agent 210(1) on endpoint device 202(1). In this example, signature information 222 may indicate that a file 224 encountered by endpoint device 202(1) was digitally signed.

The terms "digital signature," "signature file," or simply "signature" (and their derivatives), as used herein, generally refer to any type or form of mechanism for demonstrating the authenticity or legitimacy of one or more files. Digital signatures may demonstrate the authenticity of a file in a variety of ways. In some cases, digital signatures may represent portions of the files they are authenticating (e.g., a file's signature may be embedded within the file itself). In other cases, these digital signatures may represent separate files that are distinct from the files they are authenticating.

For example, a publisher may generate a digital signature for a file that demonstrates the file's authenticity by (1) hashing the file and then (2) encrypting the file's hash using the publisher's private key (i.e., the non-public half of an asymmetric key pair associated with the publisher). The publisher may then embed this digital signature within the file itself or store the digital signature within a separate file. The resulting digital signature may demonstrate both (1) that the publisher (as opposed to some other potentially malicious entity) created the file in question and (2) that the file has not been tampered with or otherwise modified since leaving the publisher's possession.

Signatures may be used to demonstrate the authenticity of a single file or a group of files. For example, a publisher may wish to demonstrate the authenticity of a set of files, such as a driver package, provided by the publisher. In this example, the publisher may generate a single signature file (e.g., a catalog file) for the entire driver package by (1) generating (using, e.g., a cryptographic function) a hash of each file in the driver package and then (2) digitally signing the entire set of file hashes using the publisher's private key.

In this example, any computing device that later encounters the driver package may verify the authenticity of each file in the driver package by (1) successfully decrypting, using a public key that corresponds to the publisher's private key, the signature file to obtain the file hashes that were generated by the publisher, (2) hashing (using, e.g., the same cryptographic function that was used by the publisher) each file in the driver package to obtain a calculated hash for each file, and then (3) determining whether the calculated hashes for the files in the driver package match the file hashes provided by the publisher in the signature file. If each file hash matches, then the computing device may assume both that the driver package in question originated from the stated publisher and that the files in this driver package have not been tampered with or otherwise modified since leaving the publisher's possession.

In addition, the term "signature information," as used herein, generally refers to any type or form of data capable of identifying a file that has been digitally signed. Signature information may include a variety of data and/or information. For example, signature information may, in addition to identifying a file encountered by an endpoint that was digitally signed, identify one or more characteristics, features, and/or aspects of (1) the file in question, (2) the file's digital signature (including, e.g., the entity responsible for signing the file), (3) the endpoint device itself, (4) the computing environment associated with the file, the file's digital signature, and/or the endpoint device, and/or (5) any other information that may be helpful in determining the trustworthiness of the file, its associated digital signature, and/or the endpoint device.

For example, signature information may identify the file in question (using, e.g., various identifying information, including a hash of the file), the entity responsible for digitally signing the file (using, e.g., various identifying information, such as the entity's distinguished name), the endpoint device that encountered the file (using, e.g., various identifying information, such as the device's serial number, media access control (MAC) address, Internet Protocol (IP) address, security software serial number, etc.), the type and/or version of operating system utilized by the endpoint device (including, e.g., whether the endpoint device is running an up-to-date and/or fully patched operating system, whether a consumer or enterprise-level operating system is installed on the endpoint device, etc.), the location of the endpoint device (as determined, e.g., based on the device's IP address, geolocation, and/or operating-system locale or time zone), the state of security of the endpoint device (as determined, e.g., based on whether certain security settings are active on the endpoint device, the infection history of the endpoint device, whether the device utilizes security software and, as such, represents a "secure" or "unsecure" device type, etc.), and/or any other information that may be helpful in determining the trustworthiness of the file, its associated digital signature, and/or the endpoint device.

The systems described herein may perform step 302 in a variety of ways. In some examples, the systems described herein may proactively request the signature information received in step 302 from one or more endpoint devices. For example, aggregation module 104 on backend device 206 may query agents 210(1)-(N) for information about files encountered by endpoint devices 202(1)-(N) that have been digitally signed. Additionally or alternatively, aggregation module 104 on backend device 206 may passively receive signature information 222 from endpoint devices 202(1)-(N) as these devices encounter files that have been digitally signed.

The term "agent," as used herein, generally refers to any hardware and/or software component capable of gathering, generating, and/or exchanging signature information, as that term has been defined herein. In some examples, agents 210(1)-(N) may represent portions of security software installed on endpoint devices 202(1)-(N). For example, agents 210(1)-(N) may, as part of performing various security-related tasks on endpoint devices 202(1)-(N) (including, e.g., performing security scans on files encountered by these devices), encounter files that have been digitally signed. In this example, agents 210(1)-(N) may, upon verifying the digital signatures of these files (in the manner described above), generate and send signature information to backend device 206 that both identifies the files in question and indicates that these files were (properly) digitally signed.

In some examples, the systems described herein may store the signature information received in step 302 in a database for later analysis. For example, aggregation module 104 may store signature information 222 within database 120. Aggregation module 104 may also record the date and/or time when signature information 222 was received (e.g., as a time stamp). As will be described in greater detail below, backend device 206 may later use the information stored in database 120 to derive and/or assign a reputation for one or more files.

Returning to FIG. 3, at step 304 one or more of the systems described herein may generate, based at least in part on the signature information received in step 302, a reputation for the file that indicates the file's trustworthiness. For example, reputation module 106 may, as part of backend device 206 in FIG. 2, assign or modify, based at least in part on the signature information 222 received from endpoint device 202(1), a reputation 228 for file 224 that indicates the trustworthiness of file 224.

The term "reputation," as used herein, generally refers to any information that conveys the trustworthiness or legitimacy of an object or entity, such as a file or a signer of a file. The reputation of an object or entity may be conveyed in a variety of ways, including, for example, through the use of reputation scores (where, for example, high reputation scores indicate that a file is generally trusted and low reputation scores indicate that a file is generally untrusted), reputation designations (e.g., "trusted" or "untrusted"), prevalence information (e.g., information that identifies the number or percentage of user devices within a community that contain (1) an instance of a particular file and/or (2) files signed by a particular signer), and/or any other information that may be used to identify the trustworthiness or legitimacy of an object or entity.

The systems described herein may perform step 304 in a variety of ways. In one example, the systems described herein may assign or modify a reputation for a file based on signature information received from a single endpoint device. For example, reputation module 106 may, in response to receiving, from endpoint device 202(1), signature information 222 that indicates that file 224 was (properly) digitally signed, create or modify a reputation 228 for file 224 that indicates that file 224 is trusted. In this example, the "trusted" designation of reputation 228 may ensure that other endpoint devices that encounter file 224 do not mistakenly classify file 224 as malicious, even if a digital signature associated with file 224 (e.g., signature 226) is missing, unavailable, corrupt, or otherwise unverifiable Unfortunately, not all endpoint devices can be trusted. For example, endpoint devices may be infected and/or controlled by malicious software, such that the signature information provided by these devices may not be reliable. However, while signature information collected from a single endpoint device or a small group of endpoint devices may not be reliable, the reliability of this information may improve as the number of endpoint devices that provide this information increases and/or as the conditions or environments of these endpoint devices change. As such, in some examples the systems described herein may assign and/or modify a reputation for a file based on, among other information, signature information gathered from other endpoint devices, such as the user base of a security software publisher.

For example, reputation module 106 may increase (e.g., improve) or decrease (e.g., lower) a reputation score for a file based on the number of unique or distinct endpoint devices that have provided signature information for the file. Specifically, if reputation module 106 determines that more than a specified or predetermined number of distinct endpoint devices have provided signature information for a particular file that indicates that the file is trustworthy due to having been digitally signed, then reputation module 106 may improve the reputation of the file since the likelihood that the signature information has been falsified or is inaccurate decreases as the number of distinct endpoint devices providing this signature information increases.

In another example, reputation module 106 may assign or modify a file's reputation based on the length or amount of time signature information for a particular file has been available or collected. For example, signature information collected over a long period of time may be more reliable than signature information collected over a short period of time. Specifically, the likelihood that signature information for a file has been falsified or is inaccurate may decrease as time passes without receipt of conflicting information (such as a negative incident indicating that the file in question is malicious) since, the longer the file has been in existence, the more likely it is that additional endpoint devices have encountered and/or analyzed the file. As such, in some examples reputation module 106 may account for the age of a file and/or the amount of time that has passed since first receiving signature information for a file when assigning and/or modifying the file's reputation. Specifically, reputation module 106 may improve a file's reputation as the time period associated with collecting signature information for the file increases, assuming reputation module 106 does not receive any other conflicting information that indicates that the file is malicious. In contrast, reputation module 106 may lower a file's reputation in response to receiving information that indicates that a negative incident has occurred that indicates that the file is malicious.

Reputation module 106 may also modify and/or assign a reputation for a file based on an operating system used by the endpoint device that provided the signature information. For example, enterprise operating systems often require and/or implement additional security protocols and/or mechanisms (and/or are maintained by trained information technology administrators) over and above those provided and/or implemented by consumer operating systems. Similarly, out-of-date operating systems may be more vulnerable or susceptible to attacks than fully patched and up-to-date operating systems. As such, reputation module 106 may account for the operating system type, version, and/or patch status of an endpoint device when assigning and/or modifying a file's reputation based on signature information received from that device. Specifically, reputation module 106 may trust (or weight more heavily) signature information received from an endpoint device running an enterprise operating system and/or from an endpoint device running a fully patched and/or up-to-date operating system.

In another example, reputation module 106 may assign and/or modify a file's reputation based on the location of the endpoint device sending the signature information (as determined, e.g., based on the device's IP address, geolocation, and/or operating-system locale and/or time zone). For example, infected endpoint devices often infect other endpoint devices that are in close proximity due to shared resources, access points, etc., potentially leading to inaccurate or unreliable signature information from these devices. To account for this, reputation module 106 may improve a file's reputation as the spread or distance between endpoint devices that have provided signature information for the file increases. Specifically, reputation module 106 may improve a file's reputation in response to (1) receiving signature information for the file from endpoints in an increasing number of different locations (as determined, e.g., by a locale or time zone specified by the endpoint's operating system) and/or (2) determining that the distance between these endpoint devices has increased.

Reputation module 106 may also assign and/or modify a file's reputation based on the security settings employed by, the infection history of, and/or the overall state of security of the endpoint device sending the signature information. For example, signature information received from endpoint devices that employ or utilize certain security protocols and/or mechanisms to prevent malware infections (such as up-to-date and fully patched security software), have a clean infection history, and/or otherwise represent "secure" devices may be more reliable than signature information received from endpoint devices that do not implement these security protocols, have a history of malware infections, and/or otherwise represent "unsecure" devices. As such, reputation module 106 may account for the security settings and software employed by, the infection history of, and/or the overall state of security of an endpoint device when assigning and/or modifying a file's reputation based on signature information received from that device. Specifically, reputation module 106 may improve a file's reputation in response to receiving signature information for the file from endpoint devices that implement specific security settings and/or utilize specific security software, have clean infection histories, and/or otherwise represent "secure devices." In contrast, reputation module 106 may lower a file's reputation in response to receiving information that indicates that a negative incident has occurred that indicates that the file is malicious.

In some examples, the systems described herein may also identify, based on the catalog information received in step 302, a confidence band for the file in question. The term "confidence band," as used herein, generally refers to any statistical model or structure that reflects the amount of confidence and/or uncertainty in a value based on limited or noisy data. Confidence bands may represent confidence and/or uncertainty levels in a variety of ways, including, for example, through the use of numerical values, thresholds, or the like. Confidence bands may also provide confidence levels for a variety of objects, including reputation scores and/or binary reputation determinations (e.g., "trusted" or "untrusted").

Figure 4:
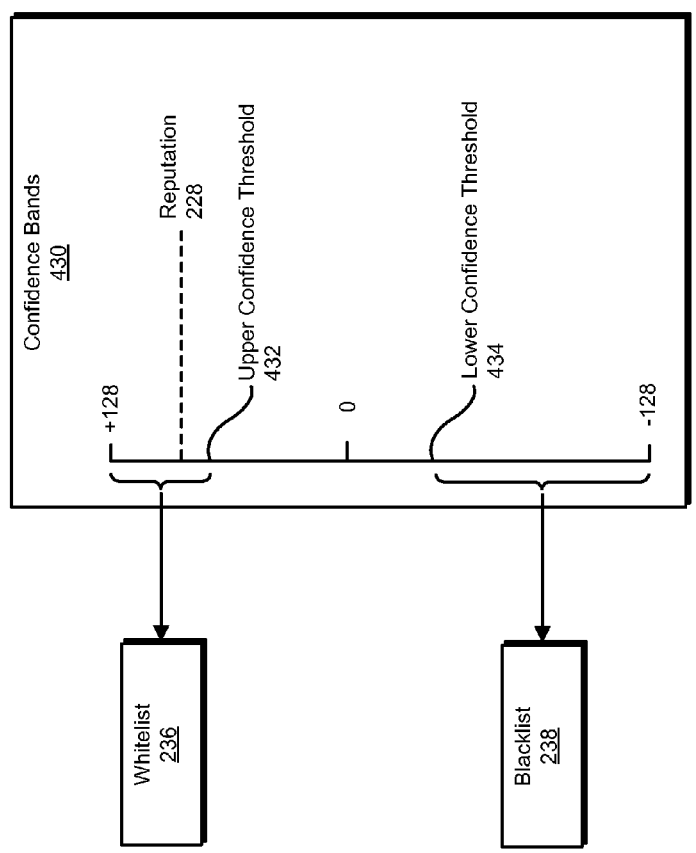
FIG. 4 is an illustration of exemplary confidence bands that may be associated with file reputations.

FIG. 4 is an illustration of exemplary confidence bands 430 that may be associated with file reputations. In some examples, confidence bands 430 may be used to assign bright-line categorizations to files (which may, in turn, be used to define various actions to be performed on these files, as discussed in greater detail below). For example, confidence bands greater than (or above) an upper confidence threshold 432 may indicate that a file is considered trustworthy (i.e., that the file has a good reputation). In contrast, confidence bands less than (or below) a lower confidence threshold 434 may indicate that a file is considered untrustworthy (i.e., that the file has a bad reputation). Similarly, confidence bands between lower confidence threshold 434 and upper confidence threshold 432 may indicate that a file has an unknown reputation and/or that a file's reputation has yet to be determined.

In some embodiments, the systems described herein may determine whether to perform various actions (such as whether to add a file to a whitelist or a blacklist) based on a categorization or reputation specified by a confidence band. For example, reputation module 106 may add files with reputations that exceed upper confidence threshold 432 to a whitelist 236 to ensure that these files are trusted by other endpoint devices. In contrast, reputation module 106 may add files with reputations that fall below lower confidence threshold 434 to a blacklist 238 to ensure that these files are not trusted by other endpoint devices.

Returning to FIG. 3, at step 306 the systems described herein may receive a request from an additional agent for reputation information for the file identified in step 302. For example, security module 108 may, as part of backend device 206 in FIG. 2, receive a request from an agent 210(N) on computing device 202(N) for reputation information for file 224.

These additional agents (such as security agents located on file servers or gateways) may request reputation information for the file in step 306 for a variety of reasons. For example, even though file 224 has been digitally signed using signature 226, agent 210(N) on computing device 202(N) may not be in possession of signature 226. Alternatively, even if agent 210(N) is in possession of signature 226, agent 210(N) may be unable to verify signature 226, either due to signature 226 being corrupted or for some other reason. In either case, agent 210(N) may be unable to determine that file 224 has been digitally signed, and may thus request reputation information for file 224 from backend device 206 in order to determine the trustworthiness of file 224.

Returning to FIG. 3, at step 308 the systems described herein may send, in response to receiving the request in step 306, the reputation for the file generated in step 304 to the additional agent to enable the additional agent to determine the trustworthiness of the file in the absence of verifiable signature conditions. For example, security module 108 may, as part of backend device 206 in FIG. 2, send reputation 228 for file 224 to agent 210(N). In this example, reputation 228 may enable agent 210(N) to determine the trustworthiness of file 224 even if signature 226 is missing, unavailable, corrupt, or otherwise unverifiable.

In some examples, endpoint device 202(N) may determine how to handle file 224 based on the reputation 228 received from backend device 206. For example, if reputation 228 indicates that file 224 is trustworthy, then endpoint device 202(N) may suspend or bypass one or more security protocols, such as scanning the file, to conserve system resources. In contrast, if reputation 228 indicates that file 224 is untrustworthy, then endpoint device 202(N) may perform additional security protocols and/or actions on file 224, such as blocking file 224 from executing, quarantining file 224, scanning file 224 for additional threats or infections, or the like.

As discussed above, the systems and methods described herein may leverage information collected from computing devices that have successfully verified the authenticity of a file that has been digitally signed to ensure that other computing devices that subsequently encounter the file do not mistakenly classify the file as malicious, even if the file's signature is missing, unavailable, corrupt, or otherwise unverifiable. In addition, by confirming and/or adjusting the file's trustworthiness based on various contextual factors that may impact the reliability of the collected information (including, e.g., the number of devices that have provided the information), the systems and methods described herein may guard against unreliable and/or intentionally distorted information. This may, in turn, increase the accuracy of these trustworthiness determinations, reduce the likelihood of disruptive false positives, and/or conserve system resources.

Figure 5:
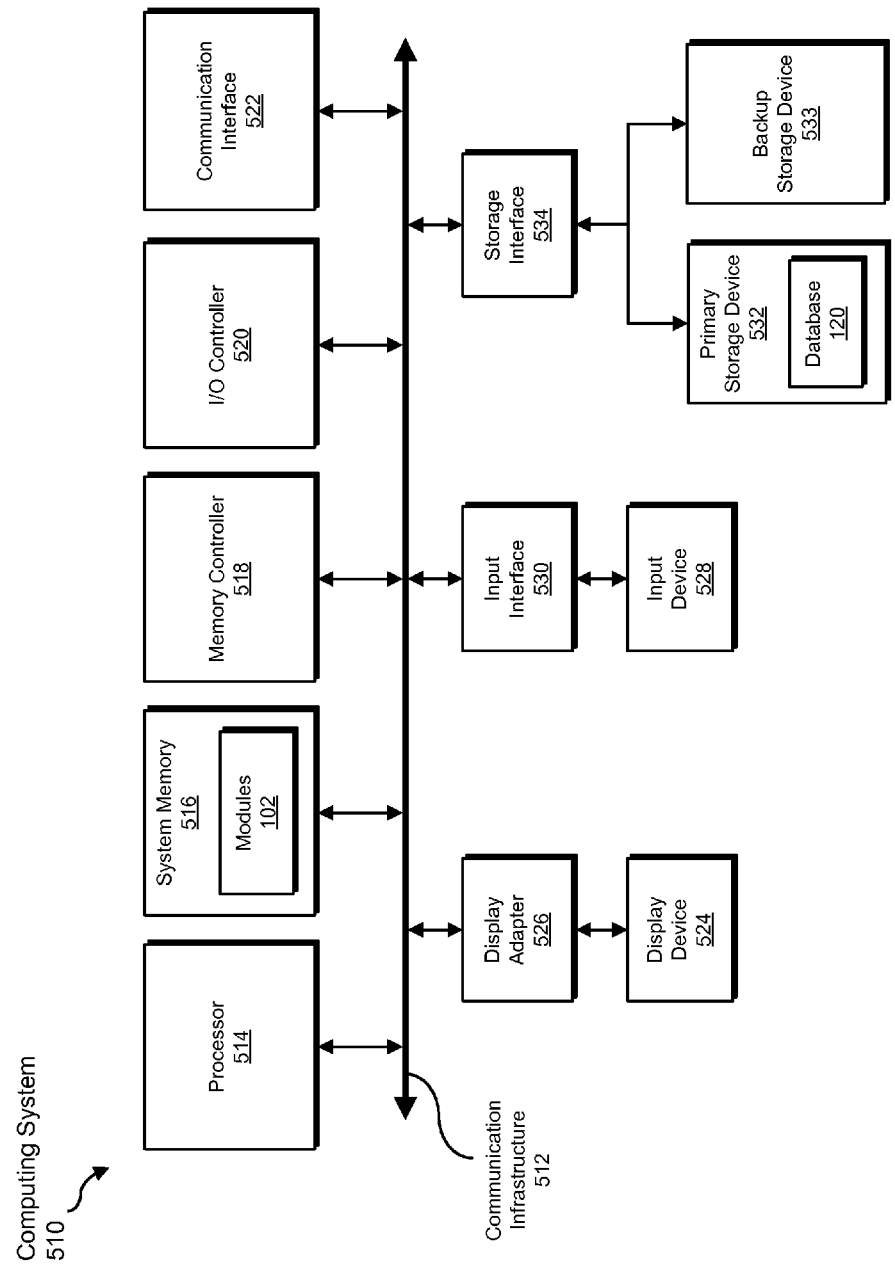
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
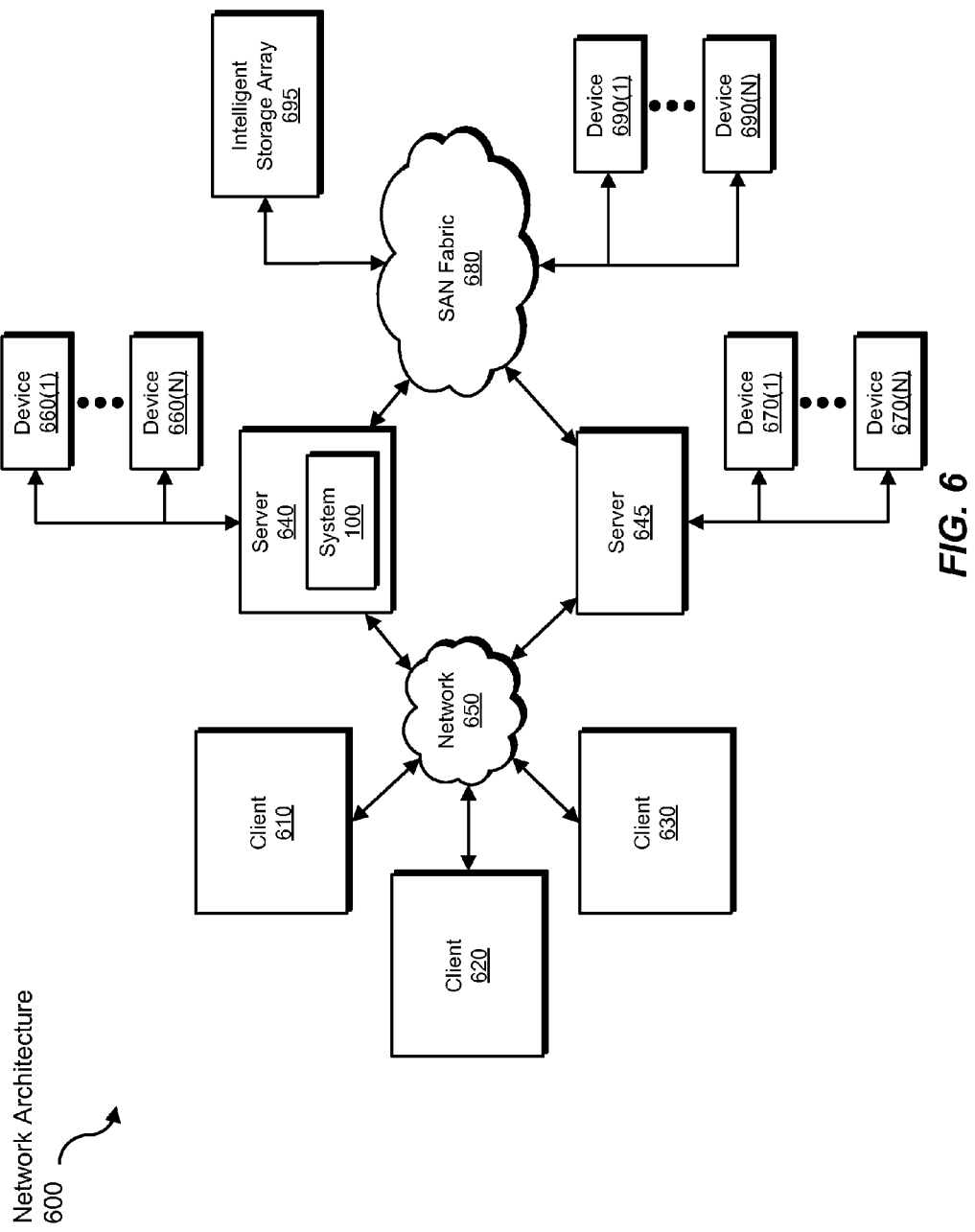
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690 (1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for trusting digitally signed files in the absence of verifiable signature conditions.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive signature information to be transformed (where the signature information indicates that a file encountered by an endpoint device has been digitally signed), transform the signature information into a reputation that indicates the file's trustworthiness, output the reputation to an additional agent to enable the additional agent to use the result of the transformation to determine the trustworthiness of the file, and store the result of the transformation in a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for trusting digitally signed files in the absence of verifiable signature conditions, at least a portion of the method being performed by a backend computing device comprising at least one processor, the method comprising:

receiving, from an agent on at least one endpoint device, signature information that indicates that a file encountered by the endpoint device has been digitally signed;

generating, based at least in part on the signature information received from the endpoint device, a reputation for the file that indicates the file's trustworthiness;

receiving a request from an additional agent for reputation information for the file; and sending, in response to receiving the request, the reputation for the file to the additional agent to enable the additional agent to determine the trustworthiness of the file in the absence of verifiable signature conditions.

2. The computer-implemented method of claim 1, further comprising:

determining that more than a specified number of distinct endpoint devices have provided the signature information; and improving the reputation of the file in response to determining that more than the specified number of distinct endpoint devices have provided the signature information.

3. The computer-implemented method of claim 1, wherein generating the reputation for the file comprises at least one of:

determining an operating system used by the endpoint device;

determining a location of the endpoint device;

determining a security setting utilized by the endpoint device;

determining whether the endpoint device represents a secure device;

determining an infection history of the endpoint device; and generating a time stamp associated with receipt of the signature information.

4. The computer-implemented method of claim 3, further comprising improving the reputation of the file in response to at least one of:

determining that the endpoint device is using a specific operating system;

determining that the endpoint device's operating system is fully patched and up-to-date;

determining that the endpoint device has enabled a specific security setting;

determining that the number of different locations associated with endpoint devices that have provided the signature information has increased;

determining that a distance between endpoint devices that have provided the signature information has increased;

determining that the number of different time zones associated with endpoint devices that have provided the signature information has increased;

determining that the amount of time that has passed since first receiving the signature information has increased without the occurrence of a negative incident that indicates that the file is malicious;

determining that the endpoint device represents a secure device; and determining that the endpoint device does not have a history of infections.

5. The computer-implemented method of claim 3, further comprising lowering the reputation of the file in response to determining that a negative incident has occurred that indicates that the file is malicious.

6. The computer-implemented method of claim 1, wherein generating the reputation for the file comprises identifying, based at least in part on the signature information, a confidence band for the file, wherein:

when the confidence band is below a lower confidence threshold, the confidence band indicates that the file has a bad reputation; and when the confidence band is above an upper confidence threshold, the confidence band indicates that the file has a good reputation.

7. The computer-implemented method of claim 6, further comprising adding, based on the reputation specified by the confidence band, the file to at least one of:

a whitelist of trusted files; and a blacklist of untrusted files.

8. The computer-implemented method of claim 1, further comprising, after receiving the signature information, recording the signature information in a database for later analysis.

9. The computer-implemented method of claim 1, wherein receiving the signature information comprises at least one of:

receiving the signature information in response to a proactive request by the backend device for the signature information; and passively receiving the signature information.

10. A system for trusting digitally signed files in the absence of verifiable signature conditions, the system comprising:

an aggregation module, stored in memory and executed by at least one physical processor, that receives, from an agent on at least one endpoint device, signature information that indicates that a file encountered by the endpoint device has been digitally signed;

a reputation module, stored in memory and executed by the physical processor, that generates, based at least in part on the signature information received from the endpoint device, a reputation for the file that indicates the file's trustworthiness;

a security module, stored in memory and executed by the physical processor, that:

receives a request from an additional agent for reputation information for the file; and in response to receiving the request, sends the reputation for the file to the additional agent to enable the additional agent to determine the trustworthiness of the file in the absence of verifiable signature conditions.

11. The system of claim 10, wherein the reputation module is further programmed to:

determine that more than a specified number of distinct endpoint devices have provided the signature information; and improve the reputation of the file in response to determining that more than the specified number of distinct endpoint devices have provided the signature information.

12. The system of claim 10, wherein the reputation module generates the reputation for the file by at least one of:

determining an operating system used by the endpoint device;

determining a location of the endpoint device;

determining a security setting utilized by the endpoint device;

determining whether the endpoint device represents a secure device;

determining an infection history of the endpoint device; and generating a time stamp associated with receipt of the signature information.

13. The system of claim 12, wherein the reputation module is further programmed to improve the reputation of the file in response to at least one of:

determining that the endpoint device is using a specific operating system;

determining that the endpoint device's operating system is fully patched and up-to-date;

determining that the endpoint device has enabled a specific security setting;
determining that the number of different locations associated with endpoint devices that have provided the signature information has increased;
determining that a distance between endpoint devices that have provided the signature information has increased;
determining that the number of different time zones associated with endpoint devices that have provided the signature information has increased;
determining that the amount of time that has passed since first receiving the signature information has increased without the occurrence of a negative incident that indicates that the file is malicious;
determining that the endpoint device represents a secure device; and
determining that the endpoint device does not have a history of infections.

14. The system of claim 12, wherein the reputation module is further programmed to lower the reputation of the file in response to determining that a negative incident has occurred that indicates that the file is malicious.

15. The system of claim 10, wherein the reputation module generates the reputation for the file by identifying, based at least in part on the signature information, a confidence band for the file, wherein:
when the confidence band is below a lower confidence threshold, the confidence band indicates that the file has a bad reputation; and
when the confidence band is above an upper confidence threshold, the confidence band indicates that the file has a good reputation.

16. The system of claim 15, wherein the reputation module is further programmed to add, based on the reputation specified by the confidence band, the file to at least one of:
a whitelist of trusted files; and
a blacklist of untrusted files.

17. The system of claim 10, wherein the aggregation module is further programmed to record the signature information in a database for later analysis.

18. The system of claim 10, wherein the aggregation module receives the signature information by at least one of:
receiving the signature information in response to a proactive request for the signature information; and
passively receiving the signature information.

19. A non-transitory computer-readable medium comprising one or more computer-executable instructions that, when executed by at least one processor of a backend computing device, cause the backend computing device to:
receive, from an agent on at least one endpoint device, signature information that indicates that a file encountered by the endpoint device has been digitally signed;
generate, based at least in part on the signature information received from the endpoint device, a reputation for the file that indicates the file's trustworthiness;
receive a request from an additional agent for reputation information for the file; and
send, in response to receiving the request, the reputation for the file to the additional agent to enable the additional agent to determine the trustworthiness of the file in the absence of verifiable signature conditions.

20. The non-transitory computer-readable medium of claim 19, further comprising additional computer-executable instructions that, when executed by the processor of the backend computing device, cause the backend computing device to modify the reputation for the file based on at least one of:
the number of distinct endpoint devices that have provided the signature information;
an operating system used by the endpoint device;
a location of the endpoint device;
a security setting utilized by the endpoint device;
whether the endpoint device represents a secure device; and
an infection history of the endpoint device.

* * * * *